(12) United States Patent
Franklin, III et al.

(10) Patent No.: US 7,521,108 B2
(45) Date of Patent: Apr. 21, 2009

(54) EMBEDDED CONNECTOR ATTACHED TO A BASE PANEL

(75) Inventors: Walter M. Franklin, III, Canyon Country, CA (US); David A. Hooke, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 15 days.

(21) Appl. No.: 10/455,148

(22) Filed: Jun. 4, 2003

(65) Prior Publication Data

US 2004/0194409 A1     Oct. 7, 2004

Related U.S. Application Data

(63) Continuation-in-part of application No. 09/861,995, filed on May 21, 2001, now abandoned.

(51) Int. Cl.
  *B32B 3/06* (2006.01)

(52) U.S. Cl. ............ 428/119; 244/131; 403/268
(58) Field of Classification Search ............... 428/119; 244/131; 403/268
  See application file for complete search history.

(56) References Cited

U.S. PATENT DOCUMENTS 4,671,470 A * 6/1987 Jonas ..................... 244/119
6,874,543 B2 * 4/2005 Schmidt et al. ......... 139/383 R

* cited by examiner

*Primary Examiner*—Alexander Thomas
(74) *Attorney, Agent, or Firm*—Mary Jo Bertani; Koestner Bertani LLP

(57) ABSTRACT

One leg of a connector connector is embedded inside a slot cut in a base panel structure. Adjacent laterally extensive legs overlap and are bonded to the face sheet of the base panel structure. Structural members can be attached to the remaining leg(s) of the connector. The legs bonded to the base panel structure enable loads to be transferred to or from the panel structure, and enable peel-off loads to be distributed through the base panel structure.

16 Claims, 2 Drawing Sheets

EMBEDDED CONNECTOR ATTACHED TO A BASE PANEL

CROSS REFERENCE TO RELATED APPLICATIONS

This application is a continuation in part of U.S. Pat. No. 09/861,995, filed May 21, 2001, to Franklin et al., now abandoned.

BACKGROUND

1. Technical Field

The present invention relates to connector-less attachments for structural members, and more particularly to a connection between a base substrate of sandwich construction and a load supporting "take-off" member, where large transverse loads can be applied to the base substrate for a wide range of service temperatures, including cryogenic temperatures.

2. Description of the Related Art

Structural connections between a sandwich or honeycomb substrate and another structural member are well known in the prior art. As an example, U.S. Pat. No. 4,671,470 to Jonas discloses a connection between sandwich skin panels and aircraft frame elements using an "H"-shaped woven composite connector. A groove is formed in the panel, and lateral extensions of the connector mid-portion are positioned over adjacent lateral surface regions of the substrate. A structural foam filler is positioned between the lower leg portions of the connector before it is inserted in the groove in the panel. After being positioned in the panel groove, the connector is secured using a bonding agent. The structural foam filler serves the purpose of backing up the connector legs to insure that they make broad area contact with the walls of the groove and enhancing its ability to transfer the shear load across the groove.

Other devices for transferring loads to and from sandwich panel structures include those taught by U.S. Pat. No. 4,800,643 to Higgins (teaches a method for mounting a fastener in a sandwich panel to support a bolt for holding auxiliary structures to the panel), and U.S. Pat. No. 5,093,957 to Do and U.S. Pat. No. 4,981,735 to Rickson (both teach mounting upper and lower disks with co-linear bores in a sandwich panel for the purpose of attaching external structure to the panel via the bores). Other similar devices are disclosed by U.S. Pat. No. 3,510,916 to Phelan, U.S. Pat. No. 3,892,099 to Worgan et al., and U.S. Pat. No. 3,305,996 to Shapiro.

The cruciform of the present invention facilitates easier installation into the sandwich panel as compared with existing art technologies. Installation of the cruciform requires only cutting a slot through the face sheet and core of the sandwich panel. This slot can be accomplished in a single cutting operation that can be performed after the sandwich structure is fabricated. Cutting the slot after the sandwich structure is fabricated provides the flexibility to accurately locate the cruciform on the sandwich panel at a later stage in the assembly process, thereby reducing the effect of assembly and manufacturing tolerance buildup.

By comparison, Jonas, U.S. Pat. No. 4,671,470, discloses a design which requires that a finite-width strip of face sheet and core be removed from the sandwich panel to form a groove for installing the H-shaped connector, or that a groove be prefabricated into the sandwich panel. Removing a strip of core to form a groove is difficult because removal requires that the core strip be severed from the inner face sheet. This operation increases the risk of damage to the inner face sheet. Prefabricating a groove into the panel significantly increases the complexity of the sandwich panel tooling and manufacturing process and greatly reduces the: capability of the design to accommodate the buildup of manufacturing and assembly tolerances.

Embodiments of the present invention avoid these drawbacks and difficulties as herein described.

Against this background, the applicant has developed a novel apparatus and method for securing a structural member to a sandwich panel that will allow transverse take-off loading through the fastener.

SUMMARY

In one embodiment, a structural member is connected to a sandwich panel structure to allow transverse take-off loading without damaging the sandwich panel structure, while overcoming many of the disadvantages and drawbacks of similar apparatus known in the art.

In another embodiment, a method for attaching a structural member to a sandwich panel distributes load on the structure member into the core of the sandwich panel in addition to distributing flat-wise tension is provided.

In another embodiment, an article of manufacture includes a load structural member attached to an underlying sandwich panel-base. A slot is cut in the base panel, and a connector is inserted and secured in the slot. The structural member can be secured to the connector.

Other advantages and features of embodiments of the invention will become more apparent, as will equivalent structures, which are intended to be covered herein, with the teaching of the principles of the disclosure in the specification, claims and drawings.

DETAILED DESCRIPTION OF THE EMBODIMENTS

The following description is provided to enable any person skilled in this or any related arts to make and use embodiments of the present invention, and sets forth the best modes contemplated by the inventor of carrying out embodiments his invention. Various modifications, however, will remain readily apparent to those skilled in the art, since the generic principles of embodiments of the present invention have been defined herein specifically to provide a novel connection and method of connecting a structural member to an underlying sandwich panel that encompasses many long sought after features that make such connections extremely easy and far less expensive to fabricate.

In some embodiments, a load transfer or structural member is secured to a base sandwich panel, which will allow large transverse or "pull-off" loads to be applied or transmitted to the base panel while distributing "peel-off" loads across the skin of the sandwich panel. The combination of connector with panel is effective through a wide range of temperatures, including cryogenic temperatures.

Prior techniques use "wet-layups" or precured and bonded "Pi" clips, "T clips" or H-shaped connectors to introduce loads to the adjacent facesheet of the base sandwich structure.

Large peel-off loads quickly cause adhesives to fail. Cryogenic applications suffer because of loss of ductility in the adhesive resulting in lower pull strength.

Figure 1:
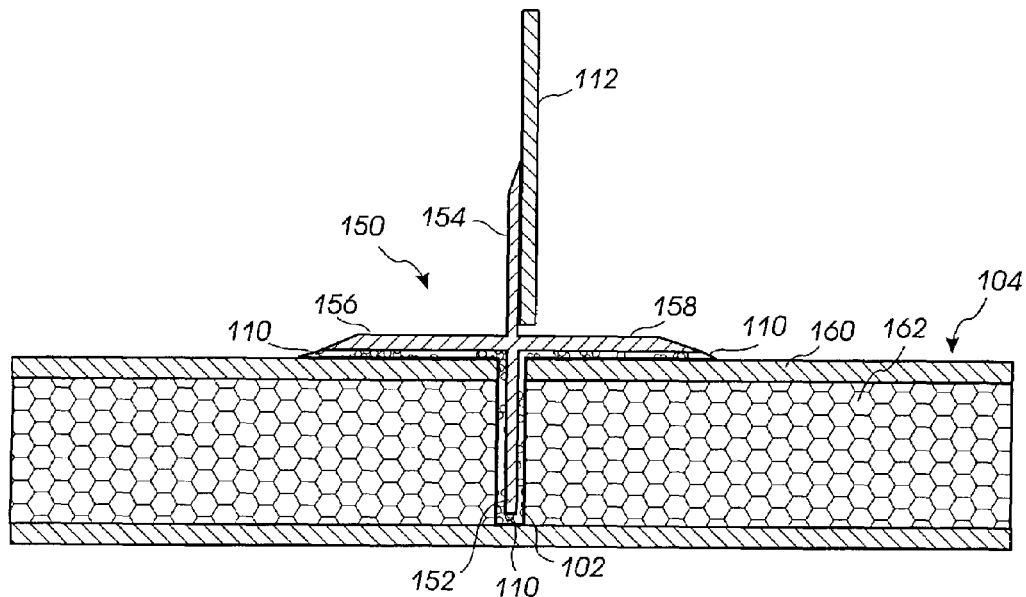
FIG. 1 depicts a cross-sectional view of an embodiment of a connector for an article of manufacture.

Embodiments of the present invention overcome the drawbacks of the known techniques through the arrangement shown in FIG. 1 of the drawings, in which a slot or groove 102 is cut or formed in a base sandwich panel structure 104, and a woven composite connector 150 is inserted and secured within slot 102 via a suitable bonding agent 110, such as an adhesive, which is applied to surfaces of connector 150 that contact base panel structure 104 including the sides of slot 102.

In some embodiments, connector 150 has the configuration of a "+" sign, and includes a first leg 152 which is adapted to be disposed in the panel slot 102, a second leg 154 extending coextensive with the first leg 152 adapted to be connected to a structural member 112. Third and fourth legs 156, 158 extend laterally and normal to the first and second legs. Third and fourth legs 156, 158 of connector 150 are adapted to be connected to face sheet 160 of base panel structure 104 to transmit shear loading thereto. Connector 150 can be fabricated using woven composite materials, plastics, metal, or other suitable material. Legs 152 through 158 of connector 150 can have bending stiffness to reduce peel loading.

Figure 2:
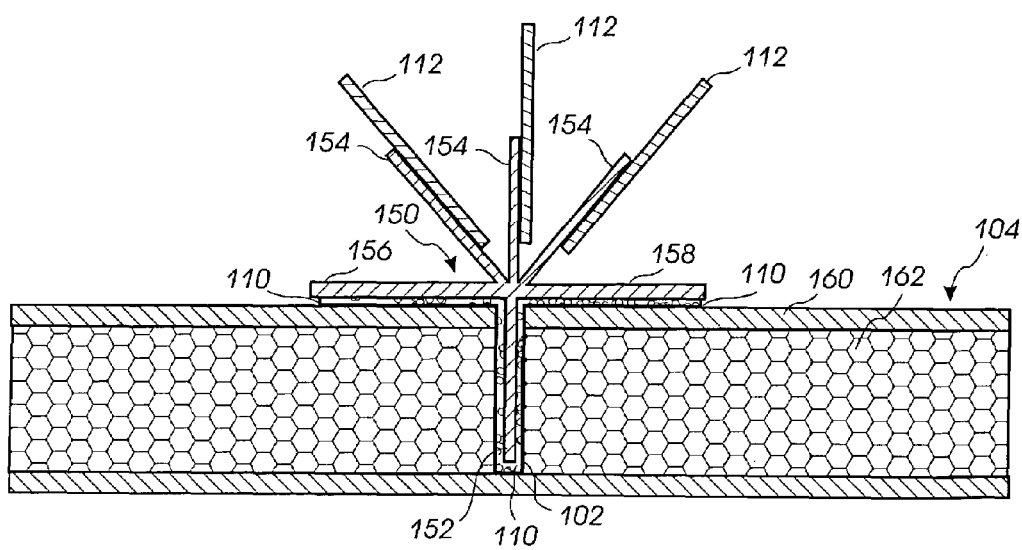
FIG. 2 depicts a cross-sectional view of another embodiment of a connector for an article of manufacture.
Figure 3:
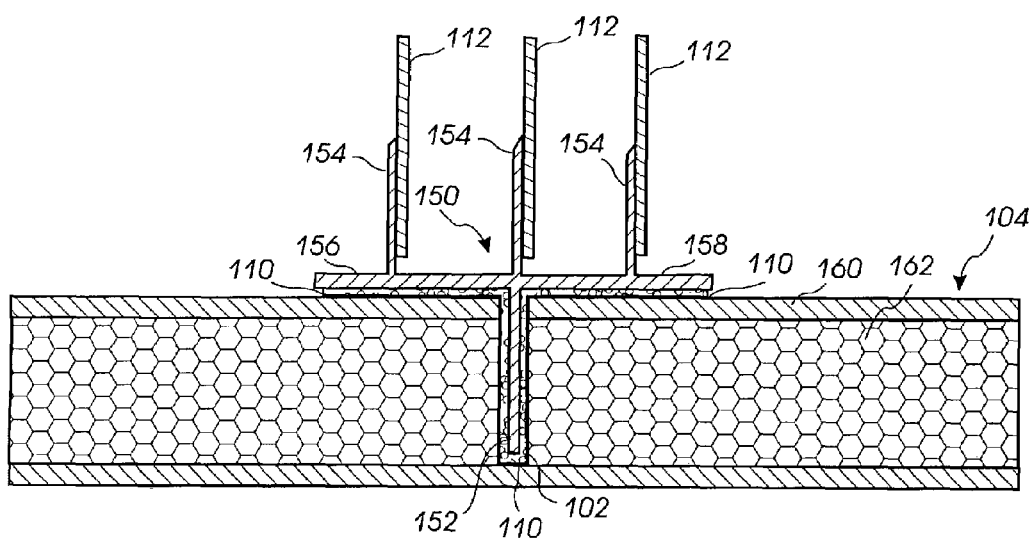
FIG. 3 depicts a cross-sectional view of yet another embodiment of a connector for an article of manufacture.

FIG. 2 shows another embodiment of connector 150 that includes additional legs 154 to accommodate attachment of additional structural members 112. Note that connector 150 can include fewer or additional legs 154 than shown in FIG. 2. When two or more legs 154 are included with connector 150, legs 154 can extend at an angle with respect to base legs 156, 158, and with respect to each other leg 154. The angles between legs 154 do not have to be the same, but rather can differ depending on the structure to be fabricated using connector 150. FIG. 3 shows yet another embodiment of connector 150 with legs 154 substantially perpendicular to legs 156 and 158. The length and thickness of legs 152, 154, 156, and 158 can be adjusted to provide the desired structural strength and stiffness. The distance between legs 154 can also vary depending on the article to be fabricated using connector 150.

Slot 102 can be cut into face sheet 160 and core 162 of the base sandwich panel structure 104 to allow insertion of the first leg 152 into core 162. First leg 152 is bonded to core 162 in slot 102 to provide a means to transfer transverse pull-off loads into core 162. An advantage is that slot 102 can be cut in a single operation after base panel structure 104 is fabricated. The single cutting operation reduces manufacturing complexity. Performing the cut after panel structure 104 is fabricated and installed avoids the build-up of assembly tolerances and increases the accuracy of locating the woven composite connector 150. Face sheet 160 and core 162 can be comprised of any suitable material, or combination of materials.

Structural member 112 can be any suitable structure, such as, for example, a panel or beam element. Structural member 112 can be secured to connector 150 using any suitable method such as bonding or mechanical fasteners. Once slot 102 has been formed in base panel structure 104, attachment of connector 150 can act as a bonded doubler so that structural strength is not dramatically reduced by cutting slot 102. Connector 150 transfers load from structural member 112 to legs 152 through 158. The thermal expansion coefficients of face sheet 160, core 162, and connector 150 can be matched.

In some embodiments, edges of legs 154, 156, and/or 158 can be chamfered as shown in FIG. 1 to provide a smooth transition between face sheet 160 and connector 150, and/or between structural member 112 and connector 150. Any exposed portion of bonding agent 110 can also be applied to blend with the chamfered edge of connector 150 to further smooth the transition between face sheet 160 and connector 150.

Embodiments of connector 150 permit distribution of both sheer and tensile loads on structural member 112 into face sheet 160 and core 162 of base panel structure 104.

Those skilled in the art will appreciate that various adoptions and modifications of embodiments of the invention as described above can be configured. Therefore, it is to be understood that, within the scope of the appended claims, embodiments of the invention may be practiced other than as specifically described herein. In the claims, unless otherwise indicated the article "a" is to refer to "one or more than one".

We claim:

1. An article of manufacture, comprising:
   a panel including a slot;
   a connector including a single leg secured in the slot in the panel; and
   at least one laterally extensive leg secured in overlying relationship to a face sheet of the panel; and
   a structural member attached to another single leg of the connector, wherein the other single leg of the connector extends outwardly from the face sheet of the panel and the connector has a cruciform ("+") shape.

2. The article of manufacture of claim 1, wherein an edge of the two legs of the connector are chamfered to smooth the transition from the face sheet of the panel to the connector.

3. The article of manufacture of claim 1, wherein the edge of the other single leg of the connector is chamfered to smooth the transition from the structural member to the connector.

4. The article of manufacture of claim 1, wherein the entire connector is fabricated using woven composite material.

5. The article of manufacture of claim 1, wherein the entire connector is fabricated using plastic material.

6. The article of manufacture of claim 1, wherein the entire connector is fabricated using metal material.

7. The article of manufacture of claim 1, wherein one side of the structural member is attached to the other single leg of the connector.

8. An article of manufacture, comprising:
   a connector including at least four legs arranged in a cruciform ("+") shape;
   a base panel with a slot, wherein the slot is wide enough to accommodate a single leg of the connector, one leg of the connector being attachable in the slot, two legs of the connector extending from the sides of the single leg, the two legs being disposed adjacent a major surface of the panel; and
   a structural member attached to another single leg of the connector, wherein the other single leg of the connector extends outside the major surface of the panel.

9. The article of manufacture of claim 8, wherein the single leg and the two legs of the connector are adhesively attached.

10. The article of manufacture of claim 8, wherein the two legs are attached to the major surface of the panel.

11. The article of manufacture of claim 8, wherein an edge of the other single leg of the connector is chamfered to smooth the transition from the major surface of the panel to the connector.

12. The article of manufacture of claim 8, wherein the edge of the two legs of the connector are chamfered to smooth the transition from the structural member to the connector.

13. The article of manufacture of claim 8, wherein the connector is fabricated using woven composite material.

14. The article of manufacture of manufacture of claim 8, wherein the connector is fabricated using plastic material.

15. The article of manufacture of claim 8, wherein the connector is fabricated using metal material.

16. The article of manufacture of claim 8, wherein the slot is cut once the base panel has been installed.

* * * * *